United States Patent [19]
Rabolt et al.

[11] Patent Number: 5,656,205
[45] Date of Patent: Aug. 12, 1997

[54] OPTICAL COMPONENTS FROM PHASE SEPARATED BLOCK POLYMERS

[75] Inventors: John Francis Rabolt, Menlo Park, Calif.; Edwin L. Thomas, Natick, Mass.

[73] Assignees: International Business Machines Corporation, Armonk, N.Y.; Massachusetts Institute of Technology, Cambridge, Mass.

[21] Appl. No.: 367,472

[22] Filed: Dec. 29, 1994

[51] Int. Cl.$^6$ .................................. F21V 9/00; G02B 6/00
[52] U.S. Cl. ...................... 252/582; 385/141; 385/143
[58] Field of Search .................. 252/82, 587; 385/143, 385/587

[56] References Cited

U.S. PATENT DOCUMENTS

| | | | |
|---|---|---|---|
| 4,315,997 | 2/1982 | Ujikawa et al. | 525/94 |
| 4,324,453 | 4/1982 | Patel | 385/143 |
| 4,440,916 | 4/1984 | Waters et al. | 525/54.3 |
| 4,848,869 | 7/1989 | Urruti | 385/143 |
| 4,913,844 | 4/1990 | DeMartino | 252/582 |
| 4,946,235 | 8/1990 | Scozzafava et al. | 350/96.34 |
| 4,957,655 | 9/1990 | Khanarian et al. | 252/299.01 |
| 5,041,509 | 8/1991 | Lee et al. | 526/243 |
| 5,053,276 | 10/1991 | Siol | 428/394 |
| 5,061,404 | 10/1991 | Wu et al. | 252/502 |
| 5,112,531 | 5/1992 | Sperling | 252/582 |
| 5,150,242 | 9/1992 | Fellows | 359/108 |
| 5,224,196 | 6/1993 | Khanarian et al. | 385/122 |
| 5,273,793 | 12/1993 | Kester et al. | 428/1 |

OTHER PUBLICATIONS

"Structure And Orientation In Thin Films: Raman Studies With Integrated Optical Techniques", J. Rabolt & J. Swalen, IBM Almaden Research Center, pp. 1–36, (1988).

"Block Copolymer Thermodynamics: Theory and Experiment", Frank Bates, Glenn Fredrickson, pp. 525–557, copyright 1990.

"Polymer–Polymer Phase Behavior", Frank Bates, Feb. 1991, pp. 898–905.

"Microphase Separation Of Block Copolymer Solutions In A Flow Field", R. Albalak & E. Thomas, Journal of Polymer Science, vol. 31, pp. 37–46, 1993.

"Raman Measurements On Thin Polymer Films and Organic Monolayers", J.F. Rabolt, R. Santo & J.D. Swalen, IBM Research Laboratory, vol. 34, No. 5, 1980, pp. 517–521.

Primary Examiner—Philip Tucker
Attorney, Agent, or Firm—Ohlandt, Greeley, Ruggiero & Perle

[57] ABSTRACT

Optical components fabricated from diblock, triblock, or multiblock copolymers, and particularly a waveguide wherein the optical field intensity (OFI) of a guided wave is tailored by selecting block copolymers, or block copolymers in combination with homopolymers, with components having different molecular weights and refractive indices, and treating the block copolymer by processing to produce phase separations which form unique morphologies controlling the shape, size, and spacing of the layers, to achieve concentration of the OFI in selected portions of the waveguide.

13 Claims, 2 Drawing Sheets

OPTICAL COMPONENTS FROM PHASE SEPARATED BLOCK POLYMERS

BACKGROUND OF THE INVENTION

1. Field of the Invention

The present invention relates to optical component design and more particularly to a waveguide and a method for producing it by tailoring the optical field intensity (OFI) of a guided wave using selected block copolymers, or block copolymers in combination with homopolymers, that are processed above the highest glass transition temperature $T_g$ of any component to form unique morphologies.

2. Prior Art

Diblock, AB, triblock, ABC, or multiblock copolymers are known to form unique morphologies when phase separation occurs. The size, shape, and spacing of the microdomains that result can be controlled through selection of the relative molecular weights of the various block copolymer components. The phase separation of the various components is driven by the thermodynamic incompatibility of their chemical components. For example, poly(styrene), PS, and poly(methylmethacrylate), PMMA, are homopolymers that are normally incompatible and hence usually will not mix to form a stable phase. If they are chemically connected to each other by covalent bonding through a chain end, then they are considered to be an AB block copolymer. When rapidly cast from solution they will form a thermodynamically unstable single phase which, when heated or otherwise brought above the glass transition temperature, $T_g$, will separate into microdomains that, for example, can be rodlike, spherical, bicontinuous cubic, lameliar, or otherwise, in shape. In certain instances the phase separation in AB block copolymers will yield stacked lamella consisting of alternating A and B slabs or layers with different refractive indices as shown in FIG. 1 wherein poly(styrene) and poly(methylmethacrylate) form the slabs. In addition, if such copolymers are roll cast from solution, then well ordered, globally oriented microdomains can be formed (see R. Albalak and E.L. Thomas, J. POLYMER SCI (Phys). 31, 37 (1993)). Other known means of globally orienting lamellar films are surface-induced ordering, mechanical, such as shear, alignment, and electric field or magnetic field alignment.

While these thin film features and characteristics are known in the art, heretofore, there has been little done toward applying such features in special waveguides and related devices (optical elements, etc.).

In this regard, an important parameter which has been shown to effect the waveguiding characteristics of a slab is the thickness (see J. F. Rabolt et al, APPLIED SPECTROMETRY, 34, 517 (1980)). In the case of diblock or triblock copolymers it would therefore appear that the relative thickness of the respective A and B, or A, B, and C, slabs should be variable by selecting the relative molecular weights of the various blocks, or by using a diluent (cOmpatible solvent, homopolymer, etc.) to selectively swell individual A, B, or C slabs. By adjusting both the individual slab thickness and its refractive index, through choosing suitable component parameters, the guided wave characteristics of a waveguide should then be tailorable for specific applications.

OBJECTS

It is therefore an object of the present invention to provide a method taking advantage of this phase separated morphology whereby selected block copolymers with suitable refractive indices can be treated or processed to control the shape, size, and spacing of each of the domains to produce an optical element, such as a waveguide.

It is another object of the invention to produce a waveguide that concentrates the optical field intensity (OFI) of a guided wave in selected portions thereof.

SUMMARY OF THE INVENTION

The present invention involves optical components such as waveguides and a method for producing them wherein the optical field intensity (OFI) of a guided wave is tailored by selecting a block copolymer with components having different molecular weights and refractive indices, and processing or treating the block copolymer to produce a phase separated geometry which forms unique morphologies controlling the shape, size, and spacing of the domains, to achieve concentration of the OFI in selected portions of the waveguide. The processing involves casting from solution, heating, or otherwise bringing the block copolymer to a temperature above the highest glass transition temperature, $T_g$, of any component for a time to form unique morphologies.

DETAILED DESCRIPTION OF THE INVENTION

The present invention is directed to the producing of optical components, and particularly waveguides, using unique diblock, triblock, or multiblock copolymer morphologies formed after microphase phase separation. More specifically, it has been appreciated that if the A and B components (diblock), or the A, B, and C components (triblock), of a block copolymer have different refractive indices, then suitable choices can be-made so as to tailor the refractive index profile of the adjacent domains to selectively concentrate or diffuse the optical field intensity (OFI) distribution in the waveguide. Accordingly, the invention will be described in terms of a preferred embodiment of optical component, i.e, an asymmetric slab waveguide, illustrative of how diblock materials can be utilized to concentrate the OFI distribution. As noted above, an important parameter which has been shown to effect the waveguiding characteristics of a slab is the thickness. In the case of diblock or triblock copolymers it has been appreciated that the relative thickness of the A and B, or A, B, and C, slabs can be varied by selecting the relative molecular weights of the various blocks, or by using a diluent (compatible solvent, homopolymer, etc.) to selectively swell an individual A, B, or C component. By adjusting both the individual slab thickness and its refractive index, through choosing suitable component parameters, the guided wave characteristics of a waveguide can be tailored for specific applications with appropriate processing.

Figure 1:
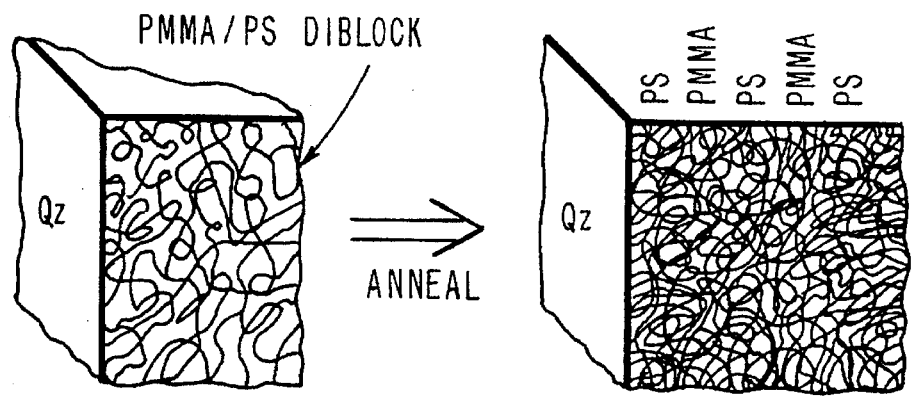
FIG. 1 illustrates the effect that heating or annealing may have on block copolymers wherein the phase separation in AB block copolymers will yield stacked lamella consisting of alternating A (PS) and B (PMMA) slabs.

A preferred processing technique involves treating a homogeneously mixed spun cast film by bringing it above the highest glass transition temperature $T_g$ of the components for a time sufficient to produce the desired ordered phase separation morphology. The resulting morphology will take the form of the components separating into microdomains with shapes that, for example, can be cylindrical or rodlike, spherical, bicontinuous cubic, lamellar or otherwise. The film may be brought above the glass transition temperature, $T_g$, of the components by heating or, for example, by the use of a solvent which lowers the transition temperature of the components below the room or ambient temperature of the operating environment. Prior to treating, the coplymer will be in a thermodynamically unstable single phase which, when brought above the glass transition temperature, $T_g$, of its components will separate into the microdomains. In certain instances the phase separation in AB block copolymers will yield stacked lamella consisting of alternating A and B slabs or layers with different refractive indices. An example is shown in FIG. 1 wherein poly(styrene), PS, and poly(methylmethacrylate), PMMA, form the slabs. In addition, if such copolymers are roll cast from solution, then well ordered, globally oriented microdomains can be formed. Other known methods of globally orienting lamellar films are the use of surface-induced ordering, mechanical, such as shear, alignment, and electric field or magnetic field alignment.

Once globally oriented the copolymer molecules can be further oriented by aligning the molecular dipoles, by means of an electric or magnetic field, to form optically anisotropic domains, e.g., a slab or layer with a refractive index which is different within the plane of the slab as compared to a direction perpendicular to the plane of the slab.

Figure 2:
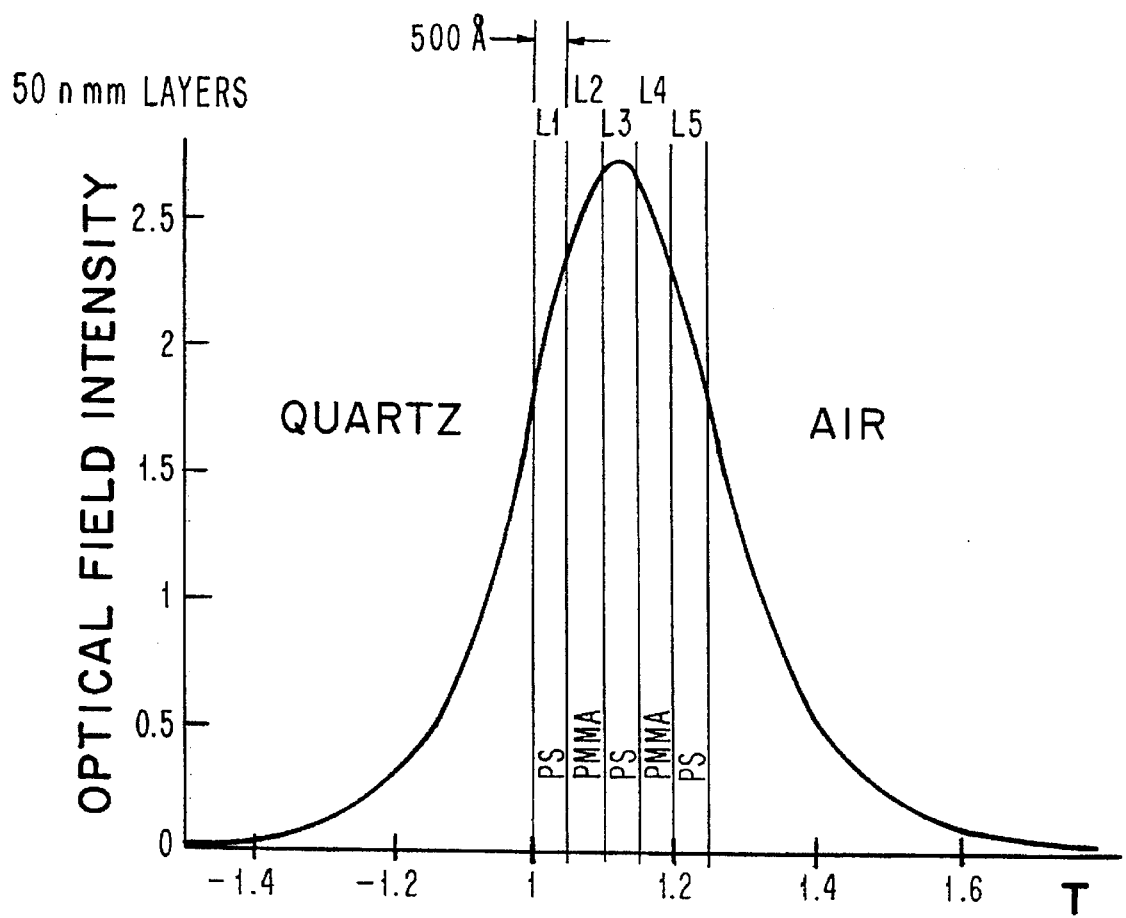
FIG. 2 is a plot of the OFI distribution for a number of distinct guiding modes (m=0,1,2) of a 5 layer alternating (AB) slab waveguide with 500Å slab thickness, wherein the OFI distribution was calculated using standard solutions of the Maxwell's equations with the appropriate boundary conditions.
Figure 3:
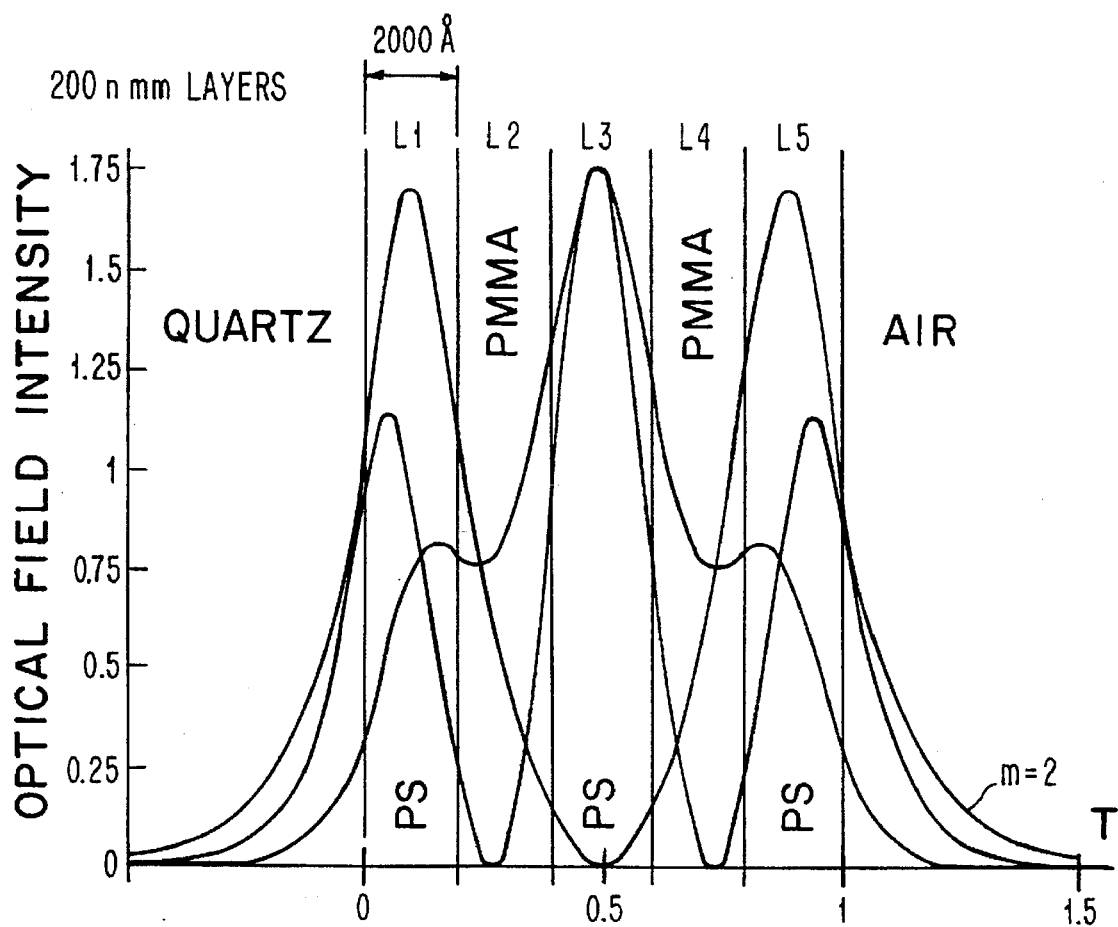
FIG. 3 is a plot of the OFI distribution for a number of distinct guiding modes (m=0,1,2) of a 5 layer alternating (AB) slab waveguide as in FIG. 2 with a slab thickness of 2000Å.

An example of the effect of slab thickness on the optical properties of an AB block copolymer with a large contrast in refractive index between the A and B components is illustrated in FIGS. 2 and 3. In this example the A and B components of the diblock are again poly(styrene) and poly(methylmethacrylate), disposed in slabs or layers, after processing, on a Quartz substrate as shown in FIG. 1. FIGS. 2 and 3 are plots of the OFI distribution for a number of distinct guiding modes (m=0,1,2) of a 5 layer alternating (AB) slab waveguide. The OFI distribution was calculated using standard solutions (see J. F. Rabolt and J. D. Swalen, SPECTROSCOPY OF SURFACES, ed. R. J. H. Clark et al, J. Wiley & Sons, 1988) of Maxwell's equations with the appropriate boundary conditions. By comparing the plot of FIG. 2, for a 500Å slab thickness, to the plot of FIG. 3, for a 2000Å slab thickness, it is apparent that increasing the A and B slab thicknesses changes the OFI within the composite film, in this case supported on the Quartz substrate. In fact this change in thickness can actually be seen to concentrate the OFI in the higher refractive index slabs. This is a very significant observation and points to a number of potential applications including preferentially choosing dye chromophores which are soluble in or covalentty (or ionically) attached to either the A or B block, or the C block in a triblock coplymer. Whichever layer the chromophore enters will become the higher index layer so that phase separation upon processing will concentrate both the dye and the OFI in the higher index slabs. Other morphological shapes such as cylinders or spheres are also potentially important when incorporated as part of an optical component. Their interaction with polarized laser radiation may be utilized to rotate the polarization vector of the incident radiation or transform it to another polarization state. In the latter case, alignment of the morphological features by mechanical means, such as shear, or an electric or magnetic field may be required. For example, electric field alignment is normally carried out above the transition temperature $T_g$, that is, the block copolymer is brought above the glass transition temperature $T_g$ of its components such as by heating followed by cooling below $T_g$ while applying an electric field. Similarly, a magnetic field may be used in the same manner. When mechanical shearing is applied to produce alignment, the application must be done while the components are above temperature $T_g$ to insure mobility of the cylinders or spheres.

It will therefore be seen that diblock or triblock copolymers can be used to form suitable optical components such as waveguides. Accordingly, under certain selected and controllable conditions phase separation into A, B, or A, B, and C, slabs of different refractive indices will occur. The OFI of a laser will be concentrated in the higher refractive index slab by choosing the appropriate slab thickness, e.g., through selection of the components' relative molecular weights or adding a diluent to swell the slab, and selecting the relative refractive indices of the individual components, with those having the largest difference being preferred. The resultant waveguides may take various forms such as symmetrical and asymmetrical slab waveguides, and channel and slab-cylindrical or aligned cylinder waveguides. Examples of suitable components and some of their block and other characteristics are set forth in the following table.

| POSSIBLE COPOLYMERS AND BLOCK CHARACTERISTICS | | | | | |
|---|---|---|---|---|---|
| Copolymer | $\chi^{(400K)}$ | N | MW (g/mol) | Stain | Solvent |
| P(S-b-I) | .080 | $1.8 \times 10^4$ | $1.6 \times 10^6$ | $OsO_4$ | Toluene |
| P(S-b-B) | .050 | $1.3 \times 10^4$ | $1.0 \times 10^6$ | $OsO_4$ | Toluene |
| P(S-b-MMA) | .038 | $2.3 \times 10^4$ | $2.4 \times 10^6$ | $RuO_4$ | Toluene |
| P(S-b-2VP) | .125 | | | $I_2$ | Toluene |
| P(S-b-DMS) | ~.3 | | | — | Toluene |

| Homopolymers | | | | | |
|---|---|---|---|---|---|
| Polymer | $T_g$ (°C.) | n (4880 Å) | $\mu_0$ (Debyes) | $\chi^M$ | $\gamma^{air(mN/m)}$ |
| PS | 98 | 1.6008 | .59 | 77.3 | 36, 40.7 |
| PI | −64 to −59 | 1.5210 | .50 | 44.4 | 30–32 |
| PB | −106 | 1.500–1.518 | .403 | 32.1 to 35.6 | 31–32, 43–48 |

-continued

| | | | | | |
|---|---|---|---|---|---|
| PMMA | 104 | 1.4945 | 1.60 | 57.3 | 41.1 |
| P2VP | | 1.5341 | | | 46 |
| PDMS | −127 | | | | 24, 19.8 |
| PVCH | | 1.50 | | 68.0 | |
| hPI | | 1.480 | .366 | 31.5 | |
| hPB | | | .34 | 42.6 | |

Key:

n (4880 Å) — refractive index at wavelength 4880 Å
$\mu_o$ — dipole moment
$\chi^M$ — magnetic moment
$\gamma_{air}$ — surface tension

What is claimed is:

1. A method for producing optical waveguides, comprising the steps of:

selecting a diblock, triblock or multiblock copolymer with components having different refractive indices;

processing said diblock, triblock or multiblock copolymer to produce phase separation of said components into respective component domains forming a multidomain waveguide, wherein each layer thereof exhibits a thickness of about at least 2000Å; and controlling the morphologies of said domains upon processing to achieve tailored concentration of the optical field intensity (OFI) of a guided wave in selected portions of said waveguide.

2. The method of claim 1 wherein said processing step comprises bringing said diblock, triblock or multiblock copolymer above the glass transition temperature $T_g$ of said components.

3. The method of claim 1 wherein the step of controlling the morphologies of said domains comprises selecting said components according to their relative molecular weights.

4. The method of claim 1 wherein the step of controlling the morphologies of said domains comprises using a diluent that will swell one of said domains.

5. The method of claim 1 wherein said domains are layers and the step of controlling the morphologies of said domains comprises controlling the size, shape, and spacing of said layers by selecting the relative molecular weights of the components.

6. The method of claim 1 wherein said diblock, triblock or multiblock copolymer is combined with one or more homopolymers.

7. The method of claim 1 further comprising the step of adding to said diblock, triblock or multiblock copolymer dye chromophores which are soluble selectively in one of the components.

8. The method of claim 1 further comprising the step of adding to said diblock, triblock or multiblock copolymer dye chromophores which covalently or ionically attach to the higher refractive index component.

9. The method of claim 1 further comprising the step of globally orienting the morphological features of said waveguide by applying a mechanical force during processing.

10. The method of claim 1 further comprising the step of globally orienting the morphological features of said waveguide by applying an electric field during processing.

11. The method of claim 1 further comprising the step of globally orienting the morphological features of said waveguide by applying a magnetic field during processing.

12. The method of claim 1 further comprising the steps of globally orienting the morphological features of said waveguide and aligning the molecular dipoles to form optically anisotropic domains.

13. The method of claim 1 wherein said processing step comprises heating said block copolymer above the glass transition temperature $T_g$ of said components followed by cooling below $T_g$ while applying an electric or magnetic field.

* * * * *